R. J. BOGUE.
COOKING UTENSIL.
APPLICATION FILED APR. 9, 1917.

1,307,078.

Patented June 17, 1919.

Inventor
Robert J. Bogue
By Lancaster and Allwine
Attorneys

UNITED STATES PATENT OFFICE.

ROBERT J. BOGUE, OF GOODLETT, TEXAS.

COOKING UTENSIL.

1,307,078.　　　　Specification of Letters Patent.　　Patented June 17, 1919.

Application filed April 9, 1917. Serial No. 160,773.

*To all whom it may concern:*

Be it known that I, ROBERT J. BOGUE, a citizen of the United States, and a resident of Goodlett, in the county of Hardeman and State of Texas, have invented a certain new and useful Improvement in Cooking Utensils, of which the following is a specification.

The present invention relates to cooking utensils, and has for an object to provide a device particularly adapted for popping corn, roasting coffee, broiling meat, toasting bread, and the like.

Another object of the present invention is to provide a utensil of this character which may be supported in the hand, and which is adapted particularly for hand use, and which may be rotated while supported in the hand.

Another object of the present invention is to provide a utensil with a foraminous body, preferably of wire meshing, adapted to retain therein the substances or material to be cooked, and to provide the body with an inner part for engagement with the substances to hold the same in position and from movement against the outer wall, during the rotation and handling of the utensil.

The above, and various other objects and advantages of this invention will be in part described, and in part understood, from the following detailed description of the present preferred embodiment, the same being illustrated in the accompanying drawing wherein.

Figure 1:
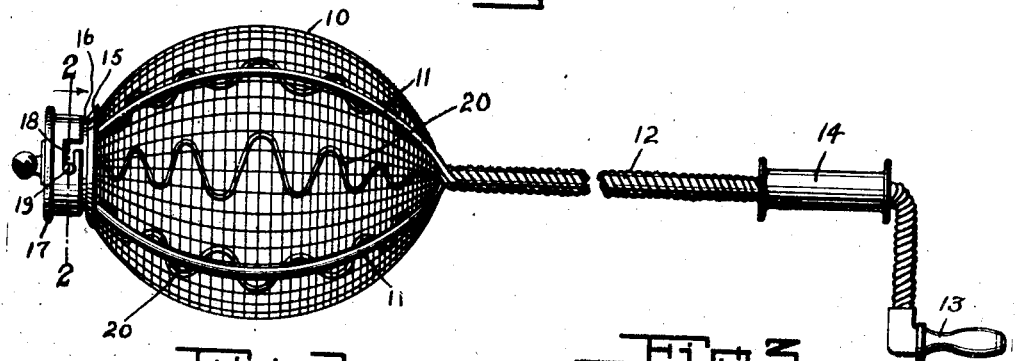
Figure 1 is a side elevation of a cooking utensil constructed according to the present invention.
Figure 2:
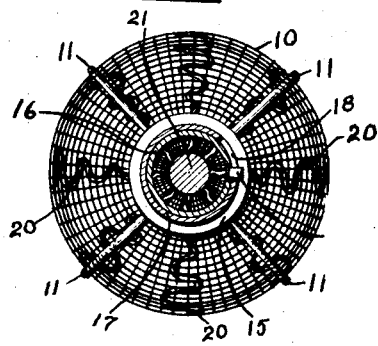
Fig. 2 is a transverse section taken through the outer end thereof substantially on the line 2—2 of Fig. 1.

Referring to this drawing, wherein like parts are designated by similar numerals of reference throughout the several views, 10 designates the body or shell of a preferably elliptically-shaped container, the body or shell 10 being constructed preferably from relatively heavy wire adapted to withstand considerable heat, and is of any desired mesh. The body 10 is reinforced by the provision of a plurality of supporting arms 11 which are preferably formed of heavy wire, and which extend exteriorly of the body and longitudinally of the same. The arms 11 converge at one end of the body 10, and are twisted together and extended outwardly from the body in axial alinement therewith to form a supporting rod or shaft 12. The outer end of the shaft 12 is bent laterally and provided with a crank handle 13 thereon by means of which the shaft 12 and the body 10 may be rotated. A hand grip 14, in the form of a sleeve is rotatably and slidably mounted upon the shaft 12, the sleeve 14 being adapted to be moved longitudinally over the shaft into various positions toward and from the body 10.

Figure 3:
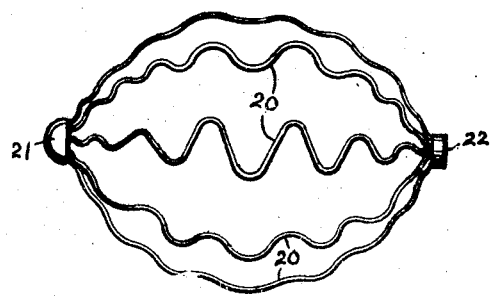
Fig. 3 is a side elevation of the retaining member removed from the shell.

One end of the body 10 is provided with a relatively large opening therethrough adapted to receive the material to be cooked, and the marginal edge of the shell or body is reinforced by the provision of a ring 15 of sheet metal or the like which is provided with an outwardly extending neck or flange 16 forming the inlet to the body 10. A cap 17 is slidably fitted over the neck 16, and is provided, in one side, with a bayonet slot 18 adapted to receive therein a radially projecting pin 19 carried upon the neck 16. The shell or body 10 is provided with a removable and adjustable retainer which is adapted to yieldingly hold steak and the like flat against the inner side of the shell 10. The retainer, as shown in Fig. 3, may comprise a plurality of resilient strands or lengths of wire 20 which are secured at opposite ends to cap pieces 21 and 22, and which are bowed outwardly to provide a resilient structure of substantially elliptical form. The strands or lengths of wire are preferably circumferentially crimped so that the wires are substantially of serpentine form, the crimps at the intermediate portions of the wires being deeper, and gradually reduced toward the opposite ends of the retainer. This peculiar formation imparts to the retainer a peculiar resiliency which serves to bind the wires yieldingly against the material placed within the shell 10 to securely hold the material flat against the wall of the shell, and to prevent displacement of the material during the rotation of the shell. As the retainer is of resilient construction, it may be readily introduced and removed through the neck or opening 15.

Figure 4:
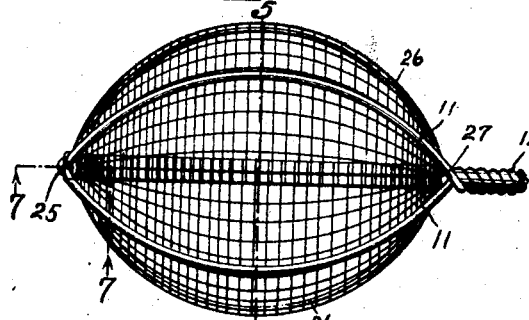
Fig. 4 is a side elevation of a slightly modified form of the utensil.
Figure 5:
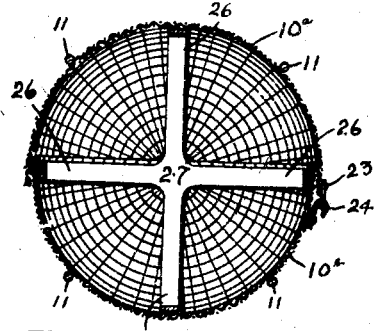
Fig. 5 is a transverse section taken substantially on the line 5—5 of Fig. 4.

In Figs. 4 to 7, inclusive, there is disclosed a modified structure of the utensil, and a retainer which may be employed in either form. The supporting arms 11 are arranged in opposed pairs, each pair carrying a semi-elliptical body section, such as 10$^a$ and 10$^b$. The section 10$^b$ is of less size than the section 10$^a$ and is adapted to turn about the axis of the body into the section 10$^a$. The adjacent edges of the body sections are overlapped, as shown in Fig. 5, and are preferably provided at one side of the body with complemental fastener members 23 and 24. The fastener is adapted to hold the sections from turning relatively to one another. As the arms 11 are made of spring wire, the sections may be turned sufficiently upon the end of the rod or shaft 12 to introduce the food or material to be cooked. The arms 11 at the outer end of the body 10$^a$ converge and are secured to an axially extending pivot pin 25. which passes through the overlapped portions of the sections 10$^a$ and 10$^b$ and is adapted to pivotally connect the same.

Figure 6:
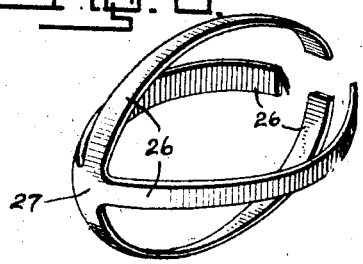
Fig. 6 is a detail perspective view of a modified form of the retainer shown in Figs. 4 and 5.
Figure 7:
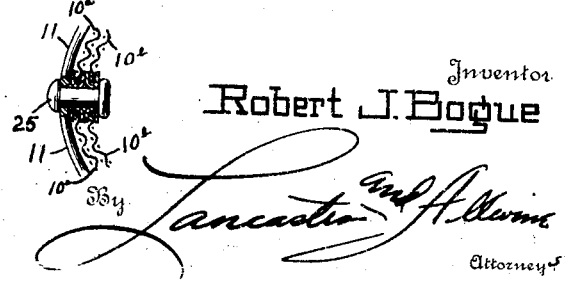
Fig. 7 is a fragmentary enlarged view in section taken on the line 7—7 of Fig. 4 through the pivotal connection between the opposite sections of the body or shell of the utensil.

The modified form of retainer shown in detail in Fig. 6, comprises a plurality of spring arms 26 of strap metal or the like which are branched from an integral supporting portion 27, the opposite ends of the arms 26 being free and adapted to spring toward and from each other. The arms 26 are bowed outwardly and are adapted to engage against the inner side of the open mesh body to retain the food or material thereagainst.

In operation, the shell is opened by the removal of the cap 17 in the form disclosed in Fig. 1, and by the turning of the sections 10$^a$ and 10$^b$ relatively to each other in the form shown in Figs. 4 and 5. The material is introduced into the body, and if it is relatively flat, such as a steak, the same is spread out against the inner side of the shell wall. The retainer is now fitted against the material and the arms 20 thereof, if the form shown in Fig. 3 is employed, or the arms 26 thereof if the form shown in Fig. 6 is employed, are pressed against the material to hold it flat against the wall of the shell. The body is now closed. The operator grasps the hand grip 14 in one hand and the crank handle 13 in the other hand. By rotating the handle 13, the shaft 12 and the body 10 are turned and the material placed about the inner wall of the body is brought consecutively to the lower side thereof and in direct contact with the fire or flame over which the body 10 is adapted to be held. The rod or shaft 12 may be of any desired length, and when the hand grip 14 is moved to the outer end of the shaft as shown in Fig. 1, the body 10 may be projected at a considerable distance from the operator so that the latter will not be burned or suffer inconvenience from the heat of the fire. It is of course understood that the hand grip 14 may be moved toward the body 10 so as to support the same when considerable weight is placed therein. The cap 17 expands the retainer in the shell.

The device is adapted for use in popping corn, roasting coffee and the like, and when this kind of material is placed in the body the arms of the retainer act as abutments to insure the thorough mixing of the material contained in the body so that the material will be evenly heated and cooked.

It is of course understood that various changes and modifications may be made in the details of construction of the above specifically described cooker without departing from the spirit thereof, and being restricted only by the scope of the following claims.

I claim:—

1. In a cooking utensil, the combination of an open mesh body adapted to be opened to receive material to be cooked, means for rotating the body, and a retainer arranged in the body and including a plurality of spring arms for engagement with the material to yieldingly hold it against the inner side of the body.

2. In a cooking utensil, the combination of a body adapted to receive material therein, and a retainer arranged in the body and comprising a plurality of spring arms connected together at one end and having their opposite ends free, said arms being bowed outwardly and adapted for binding engagement against the inner wall of the body.

3. In a cooking utensil, the combination of a two part body, means for pivotally connecting said parts together, means for detachably securing the parts in closed position, a plurality of reinforcing wires extending longitudinally over the outer surface of the body and converging at the ends of the body, said wires extended from one end of the body and twisted to form a handle, a retainer arranged in the body and including a plurality of spring arms for engagement with material to be cooked to yieldably hold it against the inner surface of the body, said handle having its outer end bent angularly with respect to the major portion thereof, and a sleeve rotatably mounted upon the handle near the angled portion.

ROBERT J. BOGUE.